United States Patent
Linville et al.

(10) Patent No.: US 6,170,022 B1
(45) Date of Patent: Jan. 2, 2001

(54) METHOD AND SYSTEM FOR MONITORING AND CONTROLLING DATA FLOW IN A NETWORK CONGESTION STATE BY CHANGING EACH CALCULATED PAUSE TIME BY A RANDOM AMOUNT

(75) Inventors: John Walter Linville; Brad Alan Makrucki, both of Durham; Edward Stanley Suffern, Chapel Hill; Jeffrey Robert Warren, Apex, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/054,768

(22) Filed: Apr. 3, 1998

(51) Int. Cl.$^7$ .............................. G06F 13/00; G06F 13/14; G06F 13/372; G06F 15/00; G06F 15/173

(52) U.S. Cl. .............................. 710/29; 710/36; 710/107; 709/226; 709/235; 370/134; 370/231; 370/232; 370/235; 370/236; 370/227

(58) Field of Search .............................. 395/821; 710/107, 710/100, 29, 36; 364/130; 709/100, 226, 235; 370/236, 134, 231, 235, 232, 389, 226, 227

(56) References Cited

U.S. PATENT DOCUMENTS

| | | | |
|---|---|---|---|
| 4,799,215 | * | 1/1989 | Suzuki .................................... 370/60 |
| 5,377,327 | * | 12/1994 | Jain et al. ............................... 395/20 |
| 5,438,568 | * | 8/1995 | Weisser, Jr. ............................. 370/60 |
| 5,668,951 | * | 9/1997 | Jain et al. ......................... 395/200.65 |
| 5,675,742 | * | 10/1997 | Jain et al. ......................... 395/200.13 |
| 5,701,292 | * | 12/1997 | Chiussi et al. ........................ 370/232 |
| 5,726,977 | * | 3/1998 | Lee ....................................... 370/235 |
| 5,768,258 | * | 6/1998 | Van As et al. ........................ 370/236 |
| 5,787,071 | * | 7/1998 | Basso et al. .......................... 370/231 |
| 5,825,861 | * | 10/1998 | Hoy ...................................... 379/134 |
| 5,901,140 | * | 5/1999 | Van As et al. ........................ 370/236 |

* cited by examiner

Primary Examiner—Thomas C. Lee
Assistant Examiner—Katherina Schuster
(74) Attorney, Agent, or Firm—Gerald R. Woods

(57) ABSTRACT

Flow control is implemented at a given node in a network of LAN switches by having the node monitor the occupancy levels of buffers or queues. When a buffer is found to be occupied or filled beyond a predetermined threshold level, a pause command is generated for the source currently supplying traffic to the buffer. A pause time PT is calculated using an equation which takes into account: the transmission rate of the identified source, the transmission rate of the output link servicing the congested buffer and queue length that can be occupied without a congestion condition being declared. To reduce the chance that queue lengths will "oscillate" about their threshold point due to multiple sources resuming transmission at the same time, each calculated pause time is adjusted to a randomly selected value PT(ran) falling within a range of PT±kPT where k may be on the order of fifty percent.

6 Claims, 4 Drawing Sheets

METHOD AND SYSTEM FOR MONITORING AND CONTROLLING DATA FLOW IN A NETWORK CONGESTION STATE BY CHANGING EACH CALCULATED PAUSE TIME BY A RANDOM AMOUNT

FIELD OF THE INVENTION

The present invention relates to data communications networks and more particularly to a method and system for providing congestion control in such a network.

BACKGROUND OF THE INVENTION

When data processing systems first were used commercially on a widespread basis, the standard system configuration was an autonomous mainframe or host computer which could be accessed only through locally-attached terminals. Few people, at that time, perceived any significant benefit from interconnecting host computers.

Over time, it came to be understood that significant commercial advantages could be gained by interconnecting or networking host computers. Data originating with users at one host computer could readily and rapidly be shared with users located at other host computers, even if those other host computers were many miles away. Also, the functional capabilities of a given host computer could be treated as a resource that could be shared not only among locally-attached users but also among remote, network-attached users. Mainframe networks of this type came to be generically referred to as Wide Area Networks, commonly abbreviated to WANs.

Certain parallels exist between the development of mainframe computer technology and the later development of personal computer technology. Early personal computers were relatively unsophisticated devices intended for use by a single user in a standalone configuration. Eventually, the same kinds of needs (data sharing and resource sharing) that drove the development of mainframe networks began to drive the development of networks of personal computers and auxiliary devices, such as printers and data storage devices.

While mainframe networks developed primarily using point-to-point connections among widely-separated mainframes, personal computer networks developed using shared or common transmission media to interconnect personal computers and auxiliary devices within a geographically-limited area, such as a building or even an area within a building. Networks of this type came to be generically referred to as Local Area Networks or LANs.

Different LAN technologies exist. Currently, the most popular LAN technology is Ethernet technology. In an Ethernet LAN, personal computers and auxiliary devices share a common bi-directional data bus. In the following description, LAN-attached devices are generically referred to as stations or LAN stations. Any transmission-capable Ethernet LAN station may initiate transmission on the bus. Every transmission propagates in both directions and is received by every Ethernet LAN station attached to the same bus, including the transmitting station.

Because several Ethernet LAN stations can attempt to claim the bus at the same time, a Collision Sense Multiple Access/Carrier Detect (CSMA/CD) protocol exists to resolve control data flow within an Ethernet LAN. The protocol is relatively simple. When a station has data to transmit, it "listens" to the bus to see if the bus is "busy"; that is, already carrying data from another station. If the bus is quiet, the listening station begins its own transmission immediately. If the bus is busy, the station with data to send waits for a predetermined interval before restarting the bus acquisition process.

Since electrical signals require time to propagate down any conductor, two or more Ethernet stations can listen, find the bus quiet at the same time, and begin transmitting simultaneously. If that happens, data from the transmitting stations collides and becomes corrupted. If a transmitting station doesn't detect the same data it transmitted, that station sends a short jamming signal and stops transmitting. The jamming signal increases the chances that all other Ethernet transmitting stations will detect the collision and stop transmitting themselves. Following a random delay, each transmitting station restarts the bus acquisition process.

Another well known LAN technology is token ring technology. In a token ring LAN, individual LAN stations are connected in a unidirectional ring. In a basic token ring, flow control is achieved by requiring that a station having data to send first acquire a token from the ring, a token being a special purpose frame representing a permission to send. Once a station acquires a token, it can insert its data onto the ring. As the inserted data circulates around the ring in a single direction, each station to which the data is addressed copies the data into station memory but does not remove the data from the ring. The data continues to circulate through the ring from one station to the next. When the data finally returns to the originating station, it is stripped from the ring.

The same user needs (data sharing and resource sharing) which drove the development of local area networks have driven the creation of LAN networks consisting of multiple LANs (Ethernet or token ring) interconnected through boundary devices known as LAN bridges or switches. Point-to-point connections or links between LAN switches permit traffic originating in any given LAN to be transported to a LAN station connected to any other LAN in the same switched network. A given switch-to-switch link typically carries traffic from multiple sources concurrently.

For a single Ethernet LAN, the CSMA/CD protocol provides a fairly effective flow control mechanism. Similarly, for a single token ring, the token protocol provides an effective flow control mechanism. However, where LANs are interconnected through switched networks, CSMA/CD and token protocols are unable to provide effective flow control on the interconnecting links.

To provide flow control on switch-to-switch links carrying Ethernet traffic, at least one standards group, the IEEE 802.3 working group, has developed a flow control standard (IEEE 802.3x) intended for that purpose. Under the standard (as currently developed), a downstream switch monitors traffic flow through the switch to detect any congested conditions. Conventionally, a switch is considered to be congested when the amount of traffic stored in a switch buffer (input and/or output) exceeds a predetermined threshold; for example, 80% of the buffer capacity. When congestion is detected, the switch can act to inhibit or pause transmission of data from one or more upstream switches. The congestion-detecting switch generates and transmits one or more pause frames, each of which contains, among other things, a pause time and a reserved multicast address. Pause times are expressed as a number of time slots, with a time slot being the time required to transmit a sixty-four byte packet on the link.

An upstream switch identified by the reserved multicast address responds to such a pause frame by temporarily suspending (pausing) traffic addressed to the downstream switch. The upstream switch resumes sending traffic when the pause time specified in the pause frame has elapsed. Currently, flow control is defined only on a link level rather than on a per-station level.

More specifically, if an upstream Ethernet switch receives a pause command originating in a downstream Ethernet switch, the upstream switch responds by suspending all traffic on its link to the downstream switch. The upstream switch ordinarily receives its traffic from multiple upstream sources, only some of which may actually be producing congestion-inducing traffic. However, where flow control is performed only on a link level, all sources to the upstream switch will be impacted by a pause frame, whether those sources are contributing to a congested condition or not.

To avoid penalizing upstream traffic sources which are not actually contributors to a downstream congested condition, it has been proposed that flow control be extended from a link level to the level of individual stations or traffic sources. Only stations or sources producing congestion-inducing traffic would be required to pause their traffic. Other stations would remain unaffected by pause commands.

The discussion above has been limited to flow control proposals for switched Ethernet network environments. Similar proposals have been made to solve similar problems in switched token ring environments.

The flow control techniques described above, whether performed at a link level or at a station level, solve some flow control problems in switched LAN environments, whether Ethernet or token ring, but in turn give rise to other problems.

When traffic flow from sources identified in generated pause frames is interrupted, the amount of traffic being directed into the congested buffer falls off sharply while the buffer continues to be emptied either to other further-downstream switches (for an output buffer) or into the switch fabric (for an input buffer). Consequently, the amount of traffic stored in the buffer quickly falls below the buffer's congestion-defining threshold level.

It can be expected that multiple upstream paused sources may resume sending traffic at the same or almost the same time, resulting in a rapid increase in traffic directed to the once-congested buffer. Consequently, buffer occupancy levels may oscillate rapidly between non-congested and congested states. Similarly, the amount of traffic actually supplied to the output link served by the buffer may also oscillate, leading to inefficient utilization of the link capacity.

SUMMARY OF THE INVENTION

The oscillation problem noted above is largely overcome by the present invention, which can be characterized as a flow control method implemented in a data communication network having a plurality of data traffic sources interconnected by transmission links. Data traffic is monitored at one or more outputs to detect the existence of congestion at the outputs. When congestion is detected at an output, sources contributing to that congestion are identified and pause time calculations are performed for each source. Before a pause command is generated, however, the calculated pause time is adjusted using a randomization function. The randomized pause time is included in the pause command sent to the identified source.

The effect of the randomization is to stagger the end points of the pause times, minimizing the chance that multiple sources will resume sending traffic at almost the same time. Observation has shown that randomization, within limits, can lead to significant improvements in link utilization.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figure 1:
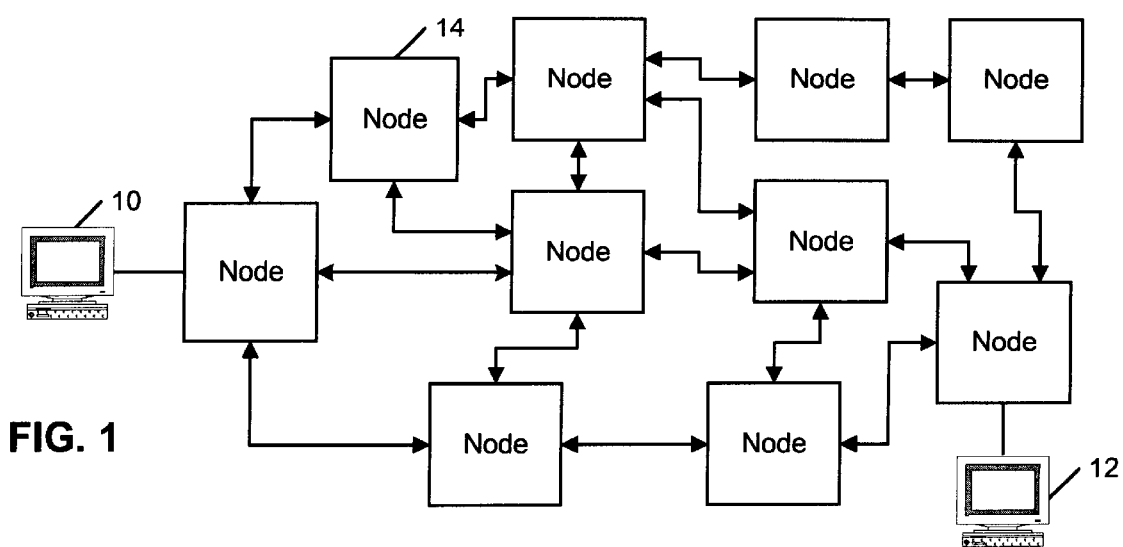
FIG. 1 is an illustration of a mesh-connected network in which the present invention is implemented.

FIG. 1 is a generic representation of a data communication network which supports communications between remote users, represented by stations 10 and 12. In such a network, data originating at one of the stations reaches the other after traversing an intervening network generically represented as a number of mesh-connected data systems or nodes, typified by node 14. The configuration and functionality of the nodes will vary as a function of the networking protocols implemented in the network. For purposes of the present invention, a node which implements the present invention must be capable of handling, traffic from multiple sources concurrently and of routing or switching traffic from any of a set of input links to any of a set of output links.

Figure 2:
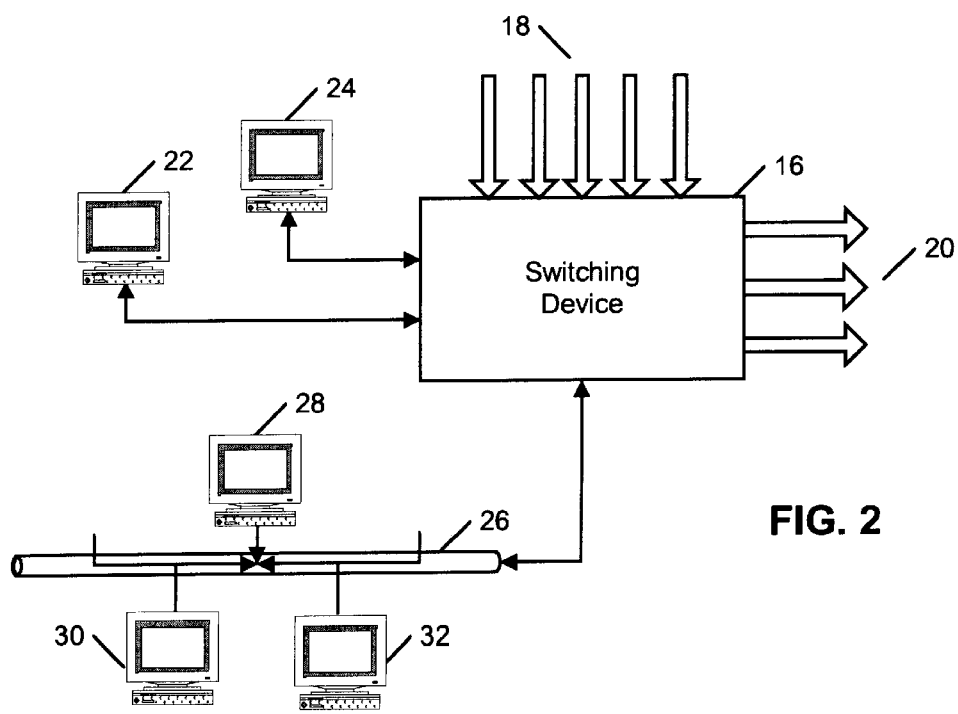
FIG. 2 is a more detailed representation of a typical switching point in the illustrated network.

Referring to FIG. 2, a node or switching device is not necessarily simply a pass-through device connecting other nodes. A switching device 16 must, of course, be capable of receiving data traffic from other nodes over a set of input links, represented collectively by reference numeral 18, and of routing or switching that data traffic to an output links selected from a set of output links, represented collectively by reference numeral 20. Typically, a switching device in a node must also be able to handle locally-originated data traffic, such as might be provided by workstations 22 and 24 attached directly to switching device 16 or by a local area network 26. From the perspective of stations on the local area network 26, such as workstations 28, 30 and 32, the switching device 16 takes on the appearance of another LAN station.

Figure 3:
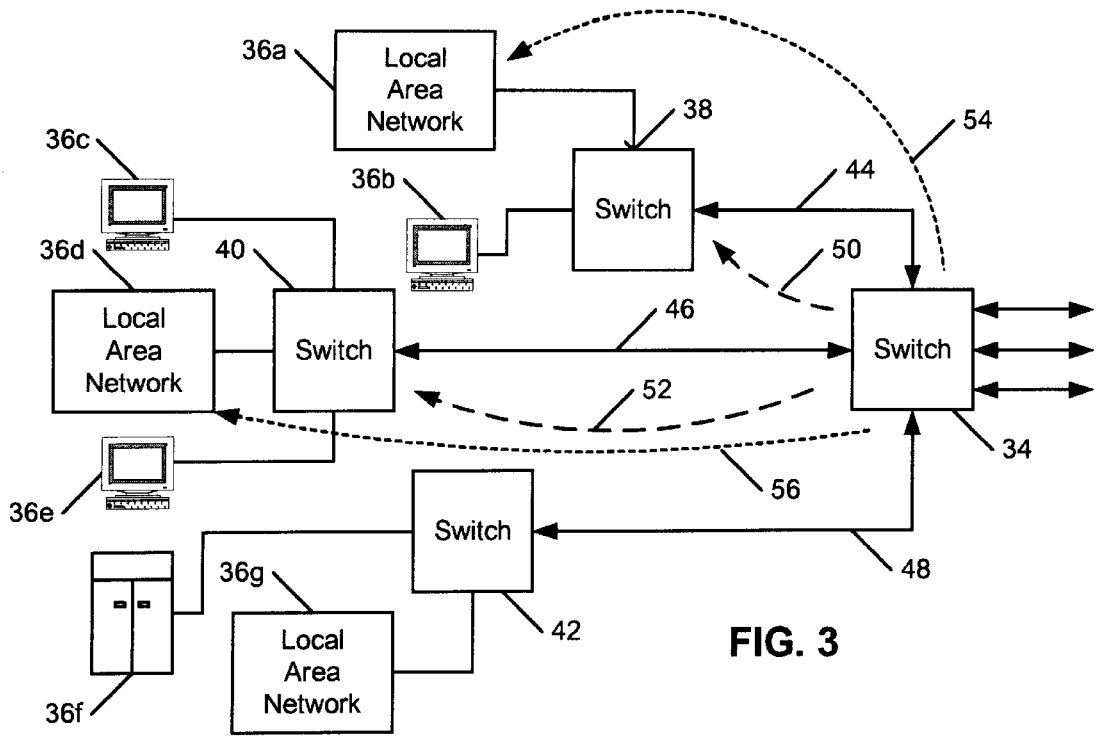
FIG. 3 illustrates the general environment for the present invention.

Referring to FIG. 3, a node or switch 34 which performs data routing/switching necessarily acts as a concentrator for data traffic originating at multiple, independent traffic sources (represented by units 36a through 36g) which provide the traffic to the node over connections made through an intervening network, represented as a set of LAN switches 38, 40 and 42, connected to switch 34 through links 44, 46 and 48, respectively. Because the traffic sources 36a through 36g operate independently of one another, the possibility exists that the sources will, at some point during their normal operation, try to supply more traffic than the switch 34 can process without incurring unacceptable delays or losses, leading to a congested condition at the switch. The present invention reduces the chances that a switch will be driven into a congested condition through the use of pause control techniques which control the flow of traffic from those upstream stations that are the source of the congestion.

As noted earlier, pause control can be performed either on a link level or a station level. When link level pause control is being performed, switch 34 can respond to detected congestion by identifying upstream switches through which congestion-inducing traffic is routed. Assuming switches 38 and 40 are identified as sources of congestion-inducing traffic, pause commands, represented by arrows 50 and 52, would be directed to those switches to temporarily suspend any transfer of traffic to switch 34 over either of links 44 and 46.

When station level pause control is being performed, switch 34 would identify specific upstream stations, such as stations 36a and 36d, providing congestion-inducing traffic. Generated pause commands, represented by arrows 54 and 56, would be directed only to those specific stations to cause those stations to temporarily suspend sending of traffic destined for the switch 34 found to be operating in a congested state.

Figure 4:
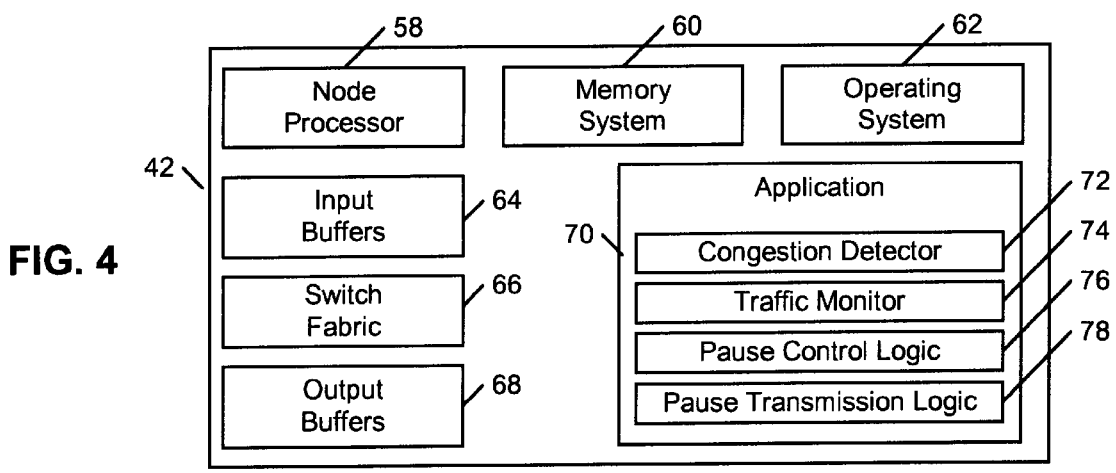
FIG. 4 illustrates the major functional components of a node in which the present invention is implemented.

In a network conforming to the IEEE 802.3x proposed standard, traffic management can be performed in the kind of node shown in block diagram form in FIG. 4. Such a node can be characterized as a specialized form of data processing system. Like any data processing system, the node includes a node processor 58, a memory system 60 and an operating system 62. To support routing and switching operations, the node also includes a set of input buffers 64 for temporarily storing data arriving over different connections on the input links, a switch fabric 66, and a set of output buffers 68 for temporarily storing switched data traffic until it can be transmitted onto output links from the node.

In a preferred embodiment, the invention is implemented as a process performed by a application program 70 executing in the node. The program 70 includes a congestion detector component 72, a traffic monitor 74, pause time logic 76 and a pause transmission logic 78. The congestion detector 72 may use any suitable technique to provide an indication of congestion at the node. As noted earlier, one commonly employed technique is to monitor the occupancy levels (amount of buffered data) of the output buffers 68. A threshold occupancy level is defined. As long as the occupancy level of a buffer remains below this threshold, the output link served by the buffer is considered to be congestion-free and no flow control actions are performed. If, however, the buffer becomes occupied beyond the threshold occupancy level, the link is considered to be congested and flow control operations may be initiated.

Figure 5:
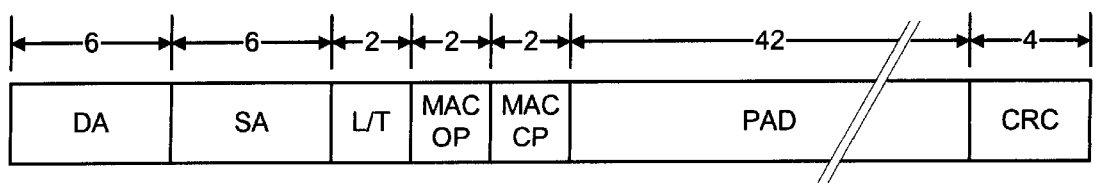
FIG. 5 shows the structure of a typical pause control frame.

As noted earlier, a network conforming to IEEE 802.3x requirements performs flow control by calculating pause times for upstream traffic sources. The general format of an IEEE 802.3x pause control frame is shown in FIG. 5. The frame includes a six byte Destination Address field DA which may contain either a reserved multicast address or the address of a particular upstream station. An upstream node recognizing the reserved multicast address will provide flow control at a link level. An upstream node recognizing the address of a particular upstream station within its domain will provide flow control at a station level.

The pause control frame further includes a six byte Source Address field SA which identifies the downstream station performing the flow control operations, a two byte Length/Type field L/T which is encoded with a value which identifies the frame as a control frame, a two byte MAC Control OpCode field MAC OP which is encoded to identify the frame as a PAUSE frame, and a two byte MAC Control Parameters field MAC CP which specifies the pause time for the affected station or link. The frame ends with a four byte Cyclical Redundancy Check (CRC) field used for error checking purposes. To bring the frame into conformance with Ethernet protocols implemented in an IEEE 802.3x system, the data field preceding the CRC field is padded with forty-two non-data characters to increase the frame length to the minimum length of sixty-four bytes required for Ethernet frames.

Figure 6:
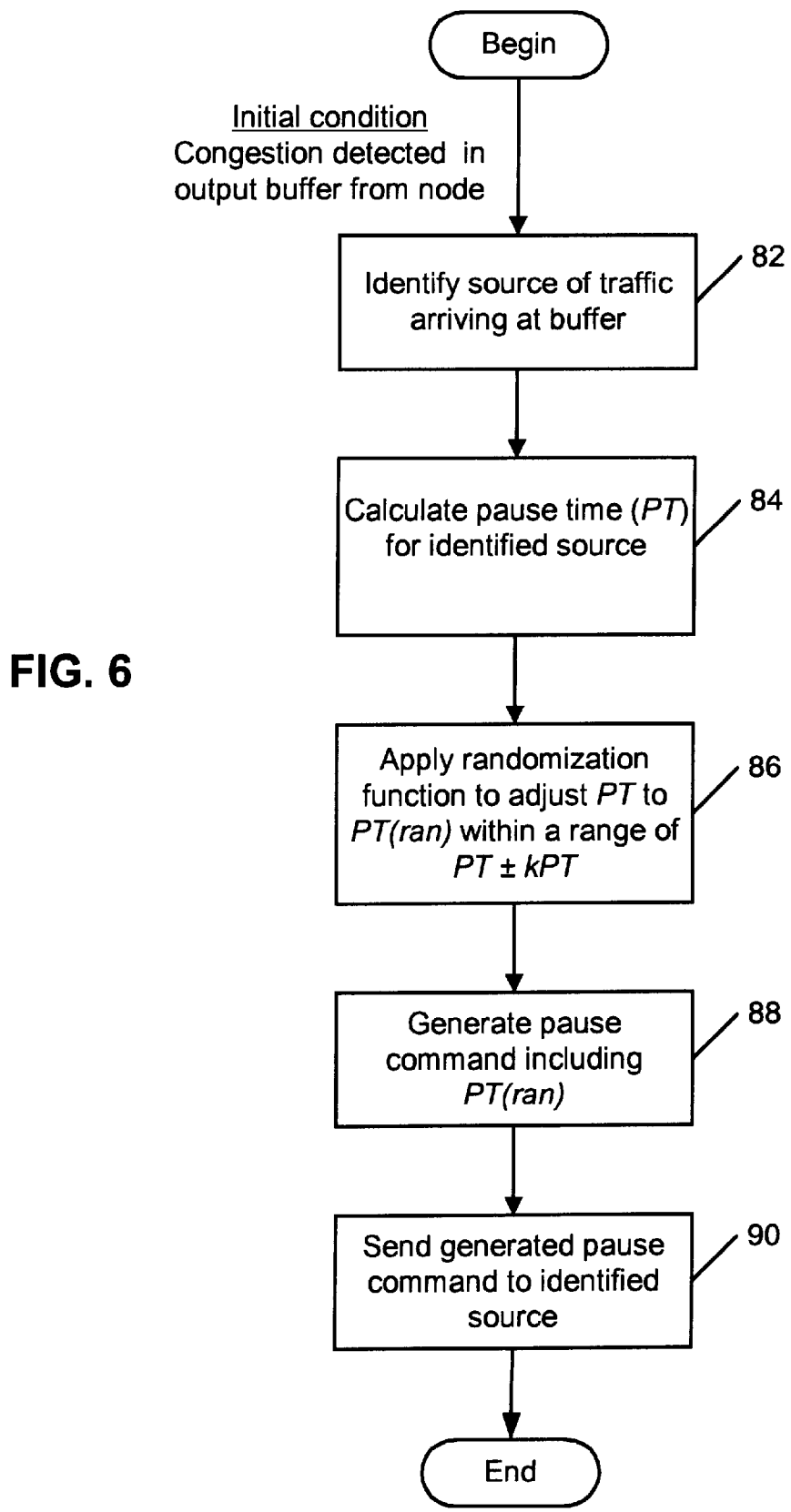
FIG. 6 is a flow chart of a preferred embodiment of a process implementing the present invention.

FIG. 6 is a flow chart of a preferred embodiment of a process implementing the present invention. The process is initiated once an initial condition is detected; specifically, that congestion has been detected in an output buffer or queue for the switch. As noted earlier, a particular queue is considered to be congested if the congestion detector component of the switch determines that a buffer is occupied beyond a predetermined threshold level. Once congestion is detected, an operation 82 is performed to identify the source of the traffic being loaded into the buffer when congestion was detected. Once the source is identified, a pause time (PT) is calculated for that source in an operation 84 using an equation which takes into account at least such variables as the transmission rate of the source, the transmission rate of the output link servicing the congested buffer and the threshold queue length. A preferred form of the equation can be expressed as:

$$PT = \frac{T_Q}{\mu} \frac{\lambda}{\mu}$$

where
$T_Q$ is the threshold queue length for the buffer found to be congested;
$\lambda$ is the transmission rate (typically, source peak speed) for the identified source; and
$\mu$ is the transmission rate for the output link servicing the congested queue.

To reduce the chances that multiple pause times will end at substantially the same time, a randomization function is then applied (operation 86) to the calculated pause time PT to adjust the pause time to a new value PT(ran) randomly selected from within a range of values centered on PT. Generally PT(ran)=PT±kPT where k is a percentage value. In a preferred embodiment of the invention, k is on the order of 50 percent, meaning that $0.5PT \leq PT(ran) \leq 1.5PT$. Known randomization techniques, such as sampling the output of a high speed counter having an appropriate output range, can be used to accomplish the randomization.

A pause command addressed to the identified source and including the randomized value PT(ran) is generated in an operation 88. The generated pause command is sent upstream to the identified source as soon as possible in an operation 90. The identified source is generally expected to execute the pause command on receipt. However, where the source is currently transmitting a frame, execution of the pause command may be delayed until the frame has been completely transmitted. A source may also delay command execution by an amount of time that is related to its transmission rate as this may provide better fairness in accurate bandwidth allocation. Alternatively, the pause command itself may contain parameters which will cause the source to delay execution of the pause command.

The process described above assumes that the generation and transmission of a pause is command is triggered by detection of congestion and that a pause command is executed without significant delay by the identified source.

Figure 7:
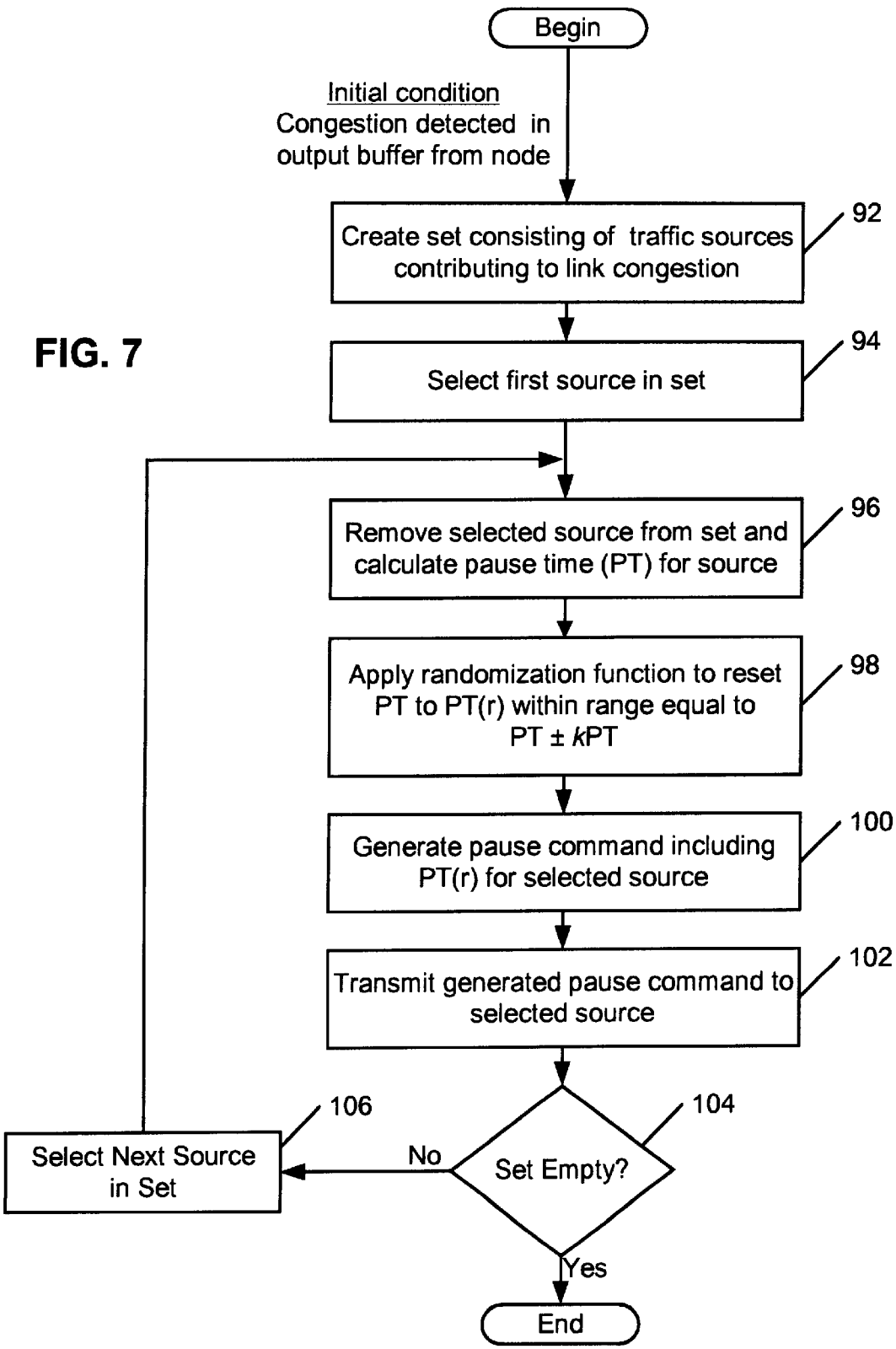
FIG. 7 is a flow chart of an alternate embodiment.

In an alternate type of pause control system, pause control actions for multiple sources are performed at the beginning of recurring control intervals. FIG. 7 is a flow chart of a process for implementing the present invention in this alternate type of system. An assumed initial condition is assumed; specifically, that an output buffer or queue is found to be congested near the end of a control interval. The system responds (operation 92) by identifying each of the sources contributing to congestion and creating a set of such sources.

The first source in the set is selected in an operation 94. The selected source is removed from the set and an appropriate pause time PT is calculated (operation 96) using an equation such as that discussed earlier. The calculated pause time is randomized (operation 98) to a value within the range PT(ran)=PT±kPT, as discussed earlier. A pause command addressed to the selected source and containing the PT(ran) value is generated (operation 100) and transmitted to the selected source (102). In this environment, execution of the pause command may be deferred until the beginning of the next control interval.

A check is made (operation 104) to determine whether the created set contains any more sources. If the set is found to be empty, meaning that all sources originally included in it have been serviced, the process ends. If the set is found not to be empty, the next source in the set is selected (operation 106) and operations 96 through 104 are repeated.

In this environment, randomization may be applied to every calculated pause time. Alternatively, a more complex randomization algorithm might be utilized. The more complex algorithm would create a set of calculated pause times for all sources identified as being contributors to a congested condition. Subsets consisting of multiple sources having substantially the same calculated pause times would be created. Randomization would be applied only to such subsets.

While there have been described what are considered to be preferred embodiments of the present invention, variations and modifications therein will occur to those skilled in the art. It is intended that the appended claims shall be construed to include the preferred embodiments and all such variations and modifications as fall within the true spirit and scope of the invention.

What is claimed is:

1. In a data communication network having a plurality of data traffic sources interconnected by transmission links, a method of controlling the flow of data traffic from said sources through a flow-controlling node to avoid congestion at the flow-controlling node, said method comprising the steps of:

monitoring traffic transiting the flow-controlling node to detect a congested state;

in response to detection of a congested state, identifying one or more sources of traffic contributing to the congestion;

for each identified source, calculating a pause time during which the identified source is to suspend directing traffic to the flow-controlling node;

changing each calculated pause time by a random amount and altering the magnitude of the pause time by a randomly selected value falling with the range PT±kPT where PT=the pause time, and k=a percentage value; and transmitting a pause command to each identified source, the pause command including the change paused time.

2. A method as set forth in claim 1 wherein the identified source is selected from a set of transmission links providing traffic to the flow-controlling node.

3. A method as set forth in claim 1 wherein the identified source is selected from a set of upstream nodes providing traffic to the flow-controlling node.

4. A method as set forth in claim 1 where $0\% \leq k \leq 50\%$.

5. For use in a node in a data communication network having a plurality of data traffic sources interconnected by transmission links, a pause control system for avoiding congestion at the node, said system comprising:

a congestion detector for detecting a congested state at the node;

a traffic monitor for identifying one or more sources of traffic contributing to the congested state;

a pause command generator for calculating a pause time for each identified source defining a pause time during which the identified source is to suspend directing traffic to the node, said pause command generator further including randomization logic for adjusting one or more of the defined pause times by a random amount limited to a range of PT±kPT where PT is a calculated pause time and k is a predetermined percentage value; and transmitter logic for sending a pause command to each identified source, the pause command including the adjusted pause time.

6. For use in a data communication network having a plurality of data traffic sources interconnected by transmission links, a node for receiving data traffic from one or more of said source, said node having a flow control system comprising:

a congestion detector for detecting a congested state at the node;

a traffic monitor for identifying one or more sources of traffic contributing to the congested state;

a pause control system for calculating a pause time for each identified source defining a pause time during which the identified source is to suspend directing traffic to the node, said pause control system further including randomization logic for adjusting one or more of the defined pause times by a random amount, the random amount being limited to a range of PT±kPT where PT is a calculated pause time and k is a predetermined percentage value; and transmitter logic for sending a pause command to each identified source, the pause command including the adjusted pause time.

* * * * *